(12) United States Patent
Williams et al.

(10) Patent No.: US 6,775,106 B1
(45) Date of Patent: *Aug. 10, 2004

(54) E-BLOCK HAVING IMPROVED RESONANCE CHARACTERISTICS AND IMPROVED FRAGILITY

(75) Inventors: Stephen P. Williams, Morgan Hill, CA (US); C. Douglas Richards, San Jose, CA (US); Jonathan C. Hofland, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/316,368

(22) Filed: Dec. 10, 2002

Related U.S. Application Data

(63) Continuation of application No. 09/394,751, filed on Sep. 13, 1999, now Pat. No. 6,538,853.

(51) Int. Cl.⁷ .............................................. G11B 21/02
(52) U.S. Cl. .................................................. 360/265.9
(58) Field of Search .......................... 360/265.9, 265.7, 360/266, 266.1, 244.5, 245.2, 244.6

(56) References Cited

U.S. PATENT DOCUMENTS

| | | | |
|---|---|---|---|
| 5,063,464 A | 11/1991 | Astheimer et al. | 360/266 |
| 5,097,584 A | 3/1992 | Cain et al. | 29/407.08 |
| 5,208,712 A | 5/1993 | Hatch et al. | 360/98.01 |
| 5,404,636 A | 4/1995 | Stefansky et al. | 29/603.03 |
| 5,444,587 A | 8/1995 | Johnson et al. | 360/245.2 |
| 5,546,649 A * | 8/1996 | Shimanuki | 29/603.03 |
| 5,764,444 A | 6/1998 | Imamura et al. | 360/294.4 |
| 5,854,725 A * | 12/1998 | Lee | 360/266 |
| 5,870,254 A * | 2/1999 | Baserman et al. | 360/224.6 |
| 5,896,246 A | 4/1999 | Budde et al. | 360/244.4 |
| 5,905,608 A | 5/1999 | Frees et al. | 360/265.9 |
| 5,953,180 A | 9/1999 | Frater et al. | 360/97.02 |
| 5,995,327 A | 11/1999 | Hanada et al. | 360/244 |
| 6,441,998 B1 * | 8/2002 | Abrahamson | 360/137 |
| 6,473,272 B1 * | 10/2002 | Resh et al. | 360/266 |
| 6,532,137 B2 * | 3/2003 | Huang et al. | 360/265.7 |

FOREIGN PATENT DOCUMENTS

JP            07282551 A     10/1995

* cited by examiner

*Primary Examiner*—Angel Castro
(74) *Attorney, Agent, or Firm*—James P. Broder; Steven G. Roeder

(57) ABSTRACT

An improved E-block for positioning one or more transducer assemblies proximate one or more rotating storage disks of a disk drive is provided herein. The E-block includes an actuator hub and one or more actuator arms which cantilever away from the actuator hub for holding the transducer assemblies proximate the rotating storage disks. As provided herein, at least one of the actuator arms is a depopulated actuator arm which retains less than two transducer assemblies. Each depopulated actuator arm includes at least one, weighted segment integrally formed into the depopulated actuator arm. Further, each depopulated actuator arm has an arm thickness which is less than an arm thickness for a double head actuator arm. The weighted segment and the reduced arm thickness allow the depopulated actuator arm(s) to vibrate similar to a populated actuator arm(s). This allows the disk drive to be designed and tuned to improve fragility and resonance characteristics of the E-block.

28 Claims, 10 Drawing Sheets

FIG. 2C *(Prior Art)*

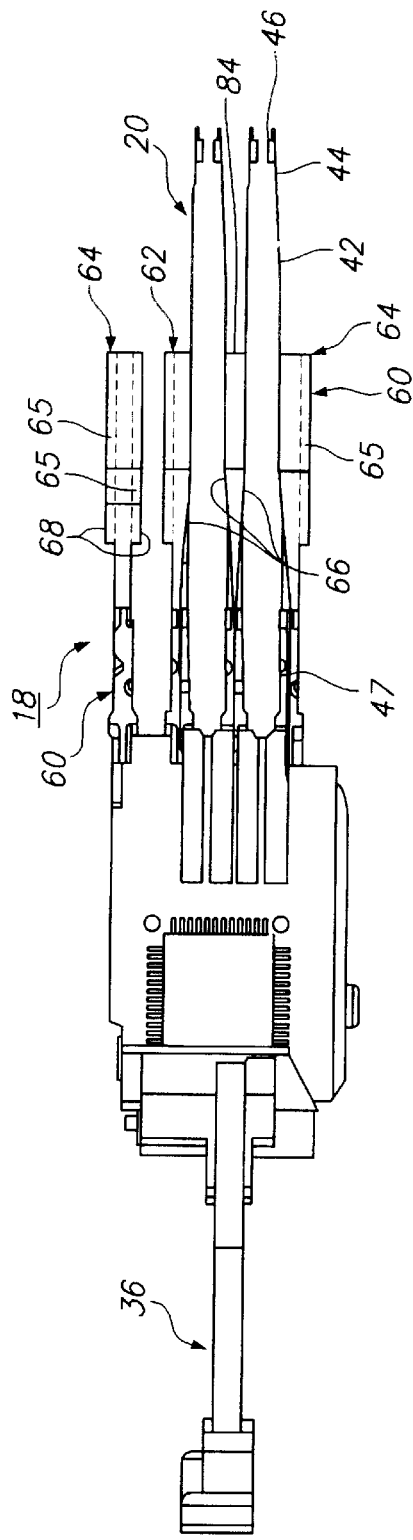
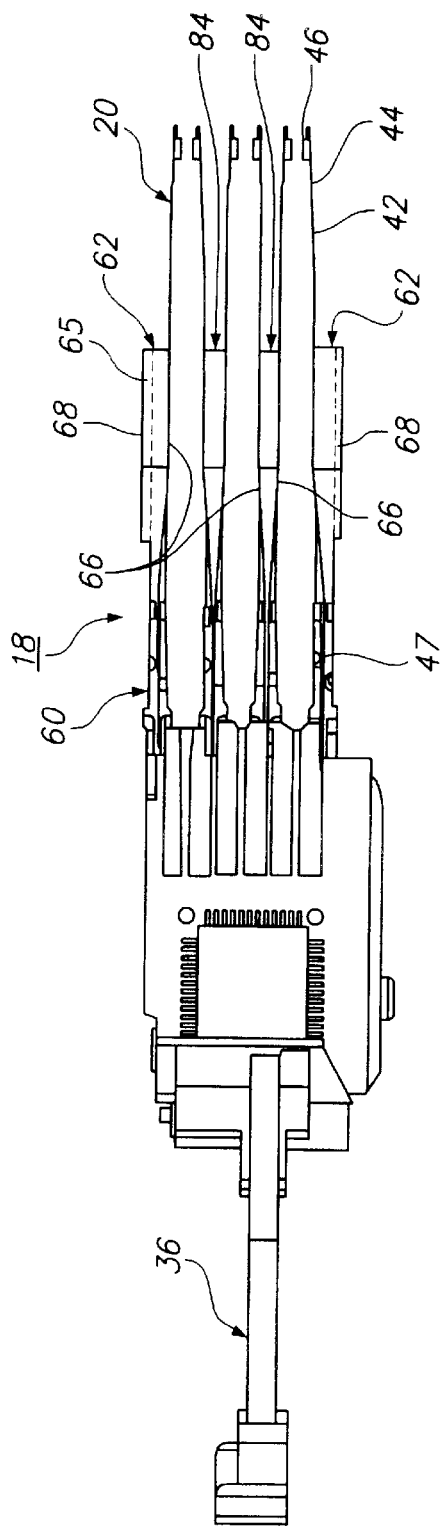
FIG. 7
FIG. 9

E-BLOCK HAVING IMPROVED RESONANCE CHARACTERISTICS AND IMPROVED FRAGILITY

REFERENCE TO RELATED APPLICATION

This is a continuation application of U.S. patent application Ser. No. 09/394,751, filed on Sep. 13, 1999 now U.S. Pat. No. 6,538,853, and entitled: "AN E-BLOCK HAVING IMPROVED RESONANCE CHARACTERISTICS AND IMPROVED FRAGILITY". This application claims priority of co-pending U.S. patent application Ser. No. 09/394,751, under 35 U.S.C. § 120. The contents of U.S. patent application Ser. No. 09/394,751 are incorporated herein by reference.

FIELD OF THE INVENTION

The present invention relates generally to disk drives for storing data. More specifically, the present invention relates to an E-block having one or more actuator arms which include one or more integrally formed weighted segments to improve the resonance characteristics and the fragility of the E-block.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular, regions of different radii, commonly referred to as "tracks". Typically, an E-block having one or more actuator arms is used to position a data transducer of a transducer assembly proximate each data storage surface of each storage disk. The E-block is moved relative to the storage disks with an actuator motor. Depending upon the design of the disk drive, each actuator arm can retain one or two transducer assemblies.

The accurate and stable positioning of each transducer assembly near each data storage surface is critical to the transfer and retrieval of information from the disks. As a result thereof, vibration in the E-block and the transducer assembly can cause errors in data transfers due to inaccuracies in the positioning of the data transducers relative to the storage disks. This is commonly referred to as "off-track motion". Additionally, extreme shock loads during shipping, handling, and/or installation of the disk drive can cause extreme vibration in the E-block and the transducer assemblies. The extreme vibration can cause the data transducers to overcome the suspension load force and leave the disk surface, resulting in a "slap" or "crash" when returning to the storage disk surface.

Because it is most economical to utilize all surfaces of the disks in a disk drive, the E-block which has the heads attached at the ends of each of its arms results in an asymmetry of the top and bottom arms with respect to the inner arms. The outer actuator arms retaining only one head are referred to as being "depopulated". The inner actuator arms retaining two transducer assemblies are referred to as being "populated". The depopulated actuator arms bend and flex at different frequencies than the populated actuator arms as a result of the asymmetrical nature of having only one transducer assembly coupled to the actuator arm. The result of this asymmetry is additional vibration modes and "off track" motion.

FIG. 1A is a top plan view which illustrates the vibration in a prior art E-block 10P and transducer assemblies 12P with force applied by an actuator motor (not shown). FIG. 1B is a side perspective view which also illustrates the vibration in the prior art E-block 10P and the transducer assemblies 12P with force applied by an actuator motor (not shown). The prior art E-block 10P in FIGS. 1A and 1B includes four actuator arms 14P and six transducer assemblies 12P. The upper most and lower most actuator arms 14P are depopulated while the middle two actuator arms 14P are populated. As a result of the asymmetrical design, the actuator arms 14P and the transducer assemblies 12P each react differently to force applied by the actuator motor and to shock loads to the disk drive.

FIGS. 2A–2C further highlight how the asymmetrical design effect the resonance characteristics of the actuator arms and/or the transducers. For example, FIG. 2A illustrates a computer simulation of the off track motion for each data transducer 16P after force applied by the actuator motor for the E-block illustrated in FIGS. 1A and 1B. FIG. 2B illustrates a computer simulation of the G's to unload as a function of shock duration for the E-block illustrated in FIGS. 1A and 1B. Stated another way, FIG. 2B illustrates the G's required to lift the transducer away from the surface of the storage disk for a given shock duration. In FIG. 2B, the curve designated 18P illustrates the movement of the transducer on the depopulated actuator arm while the curves designed 20P each illustrate movement of the transducer for a populated actuator arm. FIG. 2C illustrates the amount of arm deflection for the actuator arms 14P of the E-block 10P as a function of shock duration for the E-block illustrated in FIGS. 1A and 1B. More specifically, in FIG. 2C, curve designated 22P represents the movement of the actuator arm which does not include any transducer assemblies, curve designated 24P represents the movement of the actuator arm with a single transducer assembly, and curve designated 26P represents the movement of the actuator arm having two transducer assemblies attached to the actuator arm.

One attempt to eliminate the effect of the depopulated actuator arms includes attaching a transducer assembly to each side of each actuator arm so that each arm is populated and adding an additional storage disk to the disk drive. However, the two additional transducer assemblies and the additional storage disk increase the cost for the disk drive and take up valuable space in the disk drive. Alternately, to maintain symmetry of the E-block, a three arm E-block with six transducers could be used in place of the four arm E-block. With this design, one extra disk would be required and two surfaces, the outermost surface on the outermost disks, would not be utilized.

Another attempt to minimize off track vibration and head slap includes cantilevering a mass in the form of a dummy swage plate from each depopulated actuator arm. The dummy swage plate can be effective in adding the additional mass to the system. However, the dummy swage plate increases the inertia of the E-block. This results in increased data seek times for the disk drive because the actuator motor is not able to move the E-block as quickly. Further, the dummy swage plate typically has different dynamic behavior and stiffness since it is not practical to make one the full transducer assembly length. Typically, short, simple shaped cantilever beams or swage bases are used. Additionally, the dummy swage plate is somewhat difficult to properly position and attach to the depopulated actuator arm. This adds extra components to the disk drive and increases the manufacturing cost of the disk drive.

Yet another attempt to minimize vibration effecting head slap includes using resilient mounts to secure the disk drive.

The resilient mounts flex to attenuate shock and reduce head slap. Unfortunately, the resilient mounts also reduce disk drive performance during a data seek request.

In light of the above, it is an object of the present invention to provide a stable E-block having one or more depopulated actuator arms for a disk drive and method for making the same. Another object of the present invention is to provide an E-block having improved vibration and resonance characteristics, which does not degrade the performance of the disk drive. Still another object of the present invention is to provide an E-block which minimizes head slap and reduces drive fragility to shipping, handling, and installation. Yet another object of the present invention is to provide an E-block which can be adapted to be used with disk drives having an alternate number of storage disks. Still another object of the present invention is to provide an E-block having one or more depopulated actuator arms which is relatively easy and inexpensive to manufacture.

SUMMARY

The present invention is directed to an E-block and a method for manufacturing an E-block for a disk drive which satisfies these objectives. The E-block includes an actuator hub and a depopulated actuator arm secured to the actuator hub. The depopulated actuator arm retains less than two transducer assemblies. Uniquely, the depopulated actuator arm includes a first weighted segment integrally formed into the depopulated actuator arm. The first weighted segment is sized, shaped and located to improve the resonance characteristics of the depopulated actuator arm.

The improved resonance characteristics reduce the amount of vibration in the E-block and the transducer assemblies, thereby decreasing off-track motion, minimizing head slap, and increasing the accuracy of the disk drive. Moreover, because the weighted segment is an integral part of the actuator arm and does not cantilever away from the actuator arm, the performance impact to the actuator motor is minimized and the cost for manufacturing the E-block is not increased.

In one embodiment, the depopulated actuator arm is a single head actuator arm which retains a single transducer assembly. The single head actuator arm includes a coupled side and an opposed uncoupled side. The single head actuator arm secures one transducer assembly to the coupled side, near one storage disk. In this embodiment, the weighted segment is preferably sized, shaped and located to counterbalance the single transducer assembly.

In another embodiment, the depopulated actuator arm is a no head actuator arm which retains no transducer assemblies. The no head actuator arm including a pair of spaced apart uncoupled sides and a pair of spaced apart weighted segments. Each weighted segment is integrally formed into the actuator arm and is sized, shaped and positioned to improve the resonance characteristics of the no head actuator arm.

Depending upon the design of the disk drive, the E-block can include one or more single head actuator arms, one or more no head actuator arms and one or more double head actuator arms. As provided in detail below, this feature, for example, allows the same E-block design to be alternately manufactured for disk drives having different numbers of storage disks.

The present invention is also a method for manufacturing an E-block for a disk drive. The method includes the steps of forming an E-block having an actuator hub and a depopulated actuator arm secured to the actuator hub. The depopulated actuator arm includes an uncoupled side and a weighted segment integrally formed into the depopulated actuator arm. The weighted segment is sized, shaped and located to improve the resonance characteristics of the depopulated actuator arm.

Additionally, the arm thickness of each depopulated actuator arm is less than the arm thickness of each double head actuator arm. This causes the lateral stiffness of each depopulated actuator arm to be less than the lateral stiffness of each double head actuator arm. The combination of the weighted segment and reduced lateral stiffness allows each depopulation actuator arm to have approximately the same resonance characteristics as each double head actuator arm.

Importantly, the integrally formed weighted segment and reduced lateral stiffness improves the resonance characteristics of the E-block without significantly increasing the cost of manufacturing or degrading the performance of the disk drive. With the design provided herein, the depopulated actuator arms and the double head actuator arms have substantially similar resonance characteristics. This allows the disk drive manufacturer to better design and tune the disk drive to minimize head slap and off-track motion. Further, the disk drive can be better tuned to improve the fragility of the disk drive to shock loads during shipping and handling.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2C illustrates a computer simulation of the arm deflection of the actuator arms in FIGS. 1A and 1B;

FIG. 7 is a side plan view of the E-block, transducer assemblies and coil illustrated in FIG. 6;

FIG. 9 is a side plan view of the E-block, transducer assemblies and coil illustrated in FIG. 8;

DESCRIPTION

Figure 3:
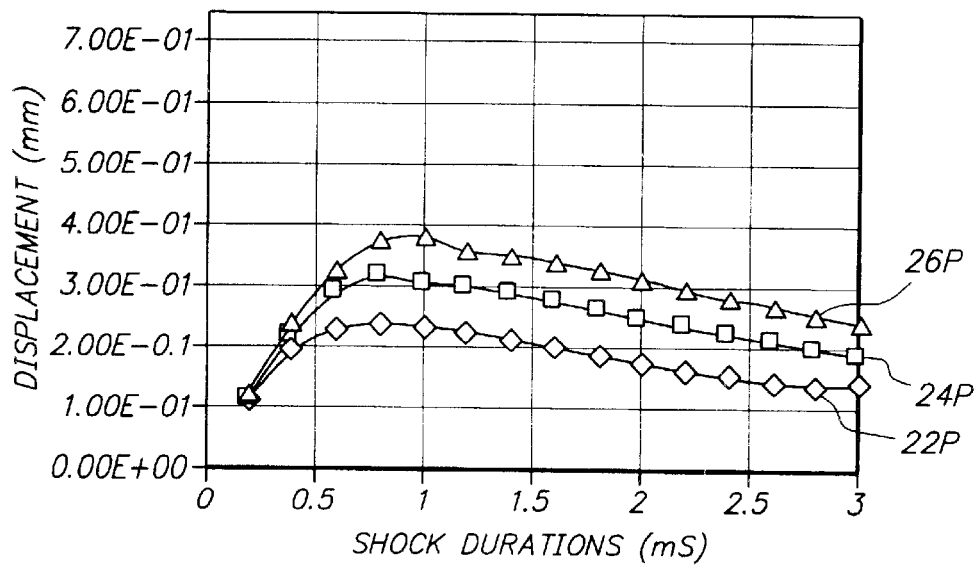
FIG. 3 is a perspective view of a disk drive having features of the present invention.
Figure 3:
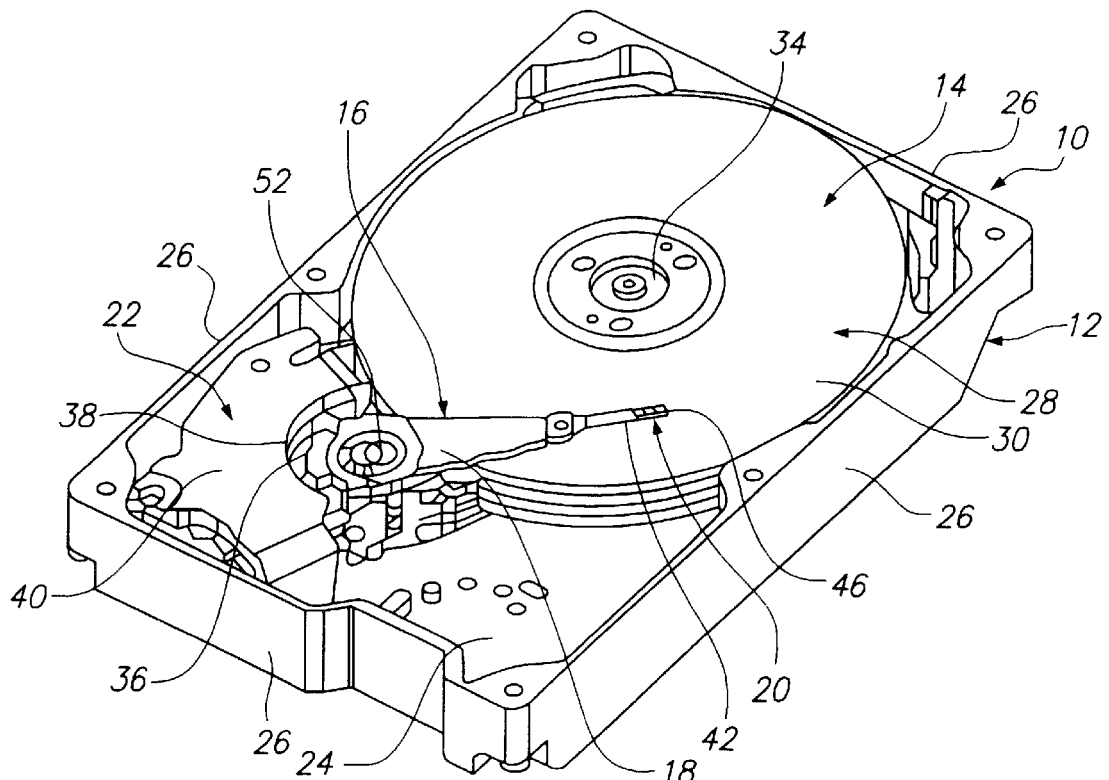

Referring initially to FIG. 3, a disk drive 10 according to the present invention includes (i) a drive housing 12, (ii) a disk assembly 14, (iii) an E-block 16 having one or more actuator arms 18, (iv) one or more transducer assemblies 20, and (v) an actuator motor 22. The E-block 16 provided herein has improved resonance characteristics. This reduces movement and flexing in the actuator arms 18 and allows the E-block 16 to accurately position the transducer assemblies 20 for more accurate data transfers. Additionally, the E-block 16 can be better tuned to reduce drive fragility to shipping, handling, and installation.

As an overview, the E-block 16 is uniquely designed so that the actuator arms 18, with the transducer assemblies secured thereto, each have similar resonance characteristics. This allows a drive manufacturer (not shown) to design and tune the disk drive 10 to minimize head slap and off-track motion.

A detailed description of the various components of a disk drive 10 is provided in U.S. Pat. No. 5,208,712, issued to Hatch et al. The contents of U.S. Pat. No. 5,208,712 are incorporated herein by-reference.

Figure 1A:
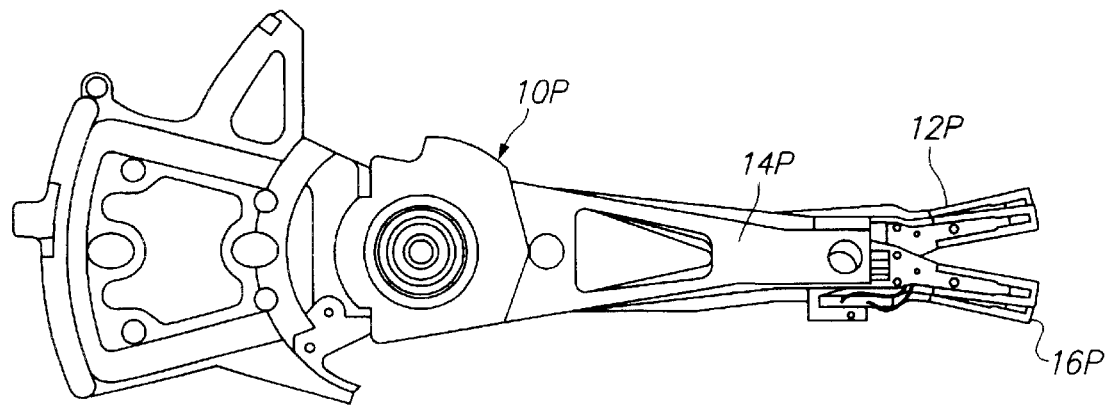
FIG. 1A is a top view illustration flexing in a prior art E-block and transducer assemblies.
Figure 1B:
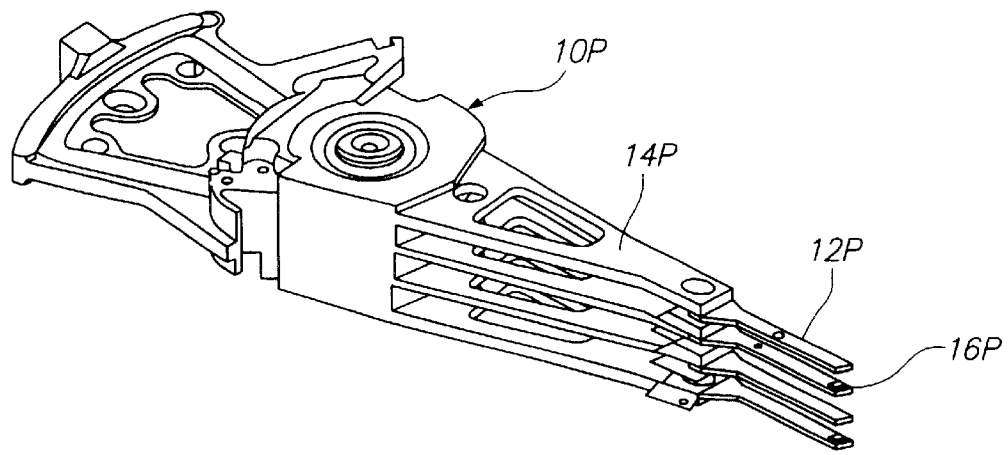
FIG. 1B is a perspective view illustrating flexing in a prior art E-block and transducer assemblies.
Figure 2A:
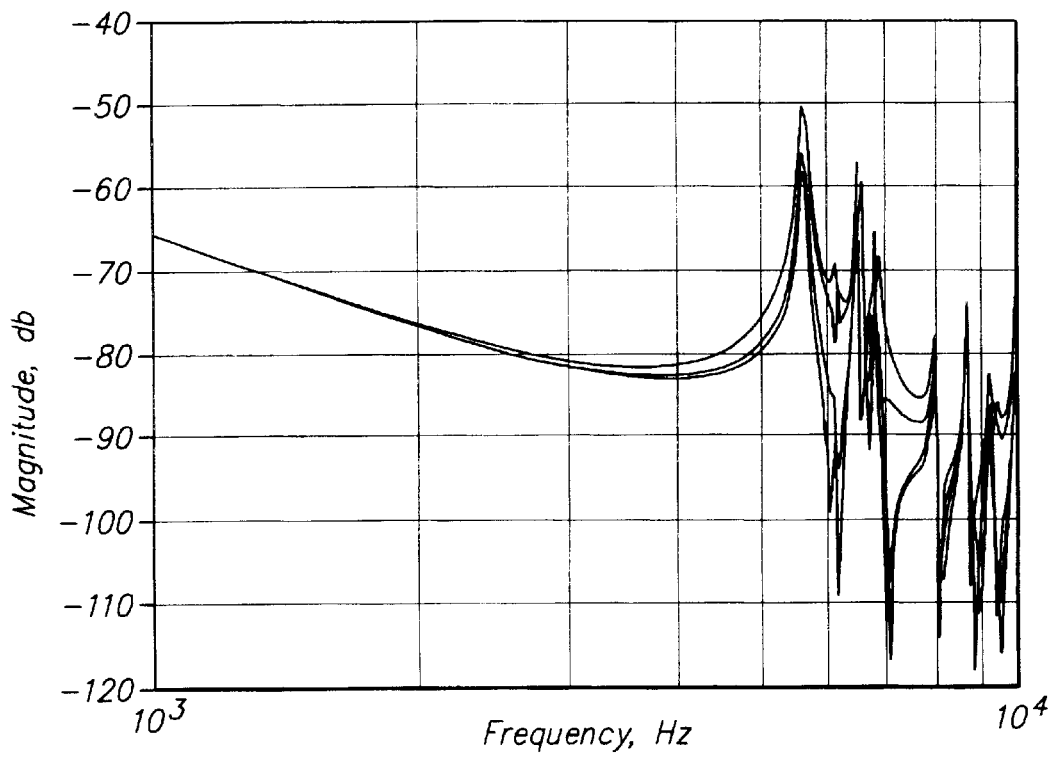
FIG. 2A illustrates a computer simulation of the bode plots for the prior art E-block and transducer assemblies of FIGS. 1A and 1B.
Figure 2B:
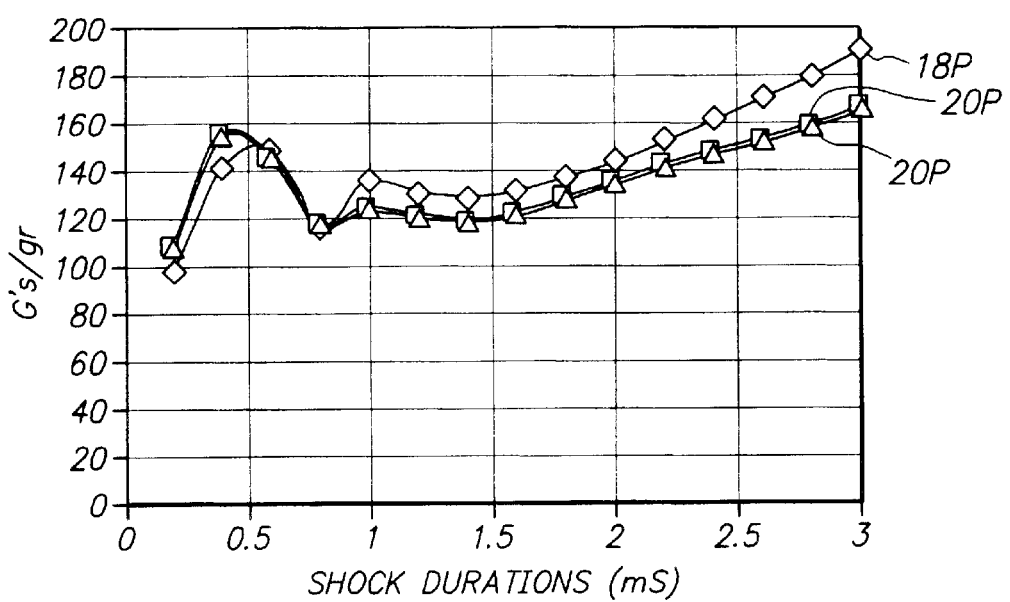
FIG. 2B illustrates a computer simulation of the G's to unload the transducers from the storage disk as a function of shock duration for the prior art E-block and transducer assemblies of FIGS. 1A and 1B.

The drive housing 12 retains the various components of the disk drive 10. The drive housing 12, illustrated in FIG. 1, includes a base 24 and four (4) side walls 26. A typical drive housing 12 also includes a cover (not shown) which is spaced apart from the base 24 by the side walls 26. The drive housing 12 is typically installed in the case of a computer (not shown) or a word processor (not shown).

The disk assembly 14 includes one or more storage disks 28 which store data in a form that can be subsequently retrieved if necessary. Magnetic storage disks 28 are commonly used to store data in digital form. Alternately, for example, each storage disk 28 can be optical or magneto-optical. For conservation of space, each storage disk 28 preferably includes a data storage surface 30 on each side of the storage disk 28. These storage surfaces 30 are typically divided into a plurality of narrow annular regions (not shown) of different radii, commonly referred to as "tracks." The storage disks 28 are manufactured by ways known to those skilled in the art.

Depending upon the design of the disk drive 10, any number of storage disks 28 can be used with the disk drive 10. For example, the disk drive 28 can include one (1), two (2), three (3), six (6), nine (9), or twelve (12) storage disks 14. For two-sided storage disks 28, the disks 28 are spaced apart a sufficient distance so that at least one (1) transducer assembly 20 can be positioned proximate each of the storage surfaces 30 of adjacent storage disks 28. To conserve space, a centerline (not shown) of consecutive disks 28 is typically spaced apart between about one millimeter (1.0 mm) to three millimeters (3.0 mm).

The storage disks 28 are spaced apart on a disk spindle 34 which is mounted to a spindle shaft (not shown) which is secured to the base 24. The disk spindle 34 rotates on a disk axis (not shown) relative to the spindle shaft on a spindle bearing assembly (not shown). Typically, the disk spindle 34 and the storage disks 28 are rotated about the disk axis at a predetermined angular velocity by a spindle motor (not shown).

The rotation rate of the storage disks 28 varies according to the design of the disk drive 10. Presently, disk drives 10 utilize disks 28 rotated at an angular velocity of between about 4,500 RPM to 10,000 RPM. It is anticipated that technological advances will allow for disk drives 10 having storage disks 28 which rotate at higher speeds, such as about 15,000 or more RPM.

The design of the E-block 16 depends upon the design of the actuator motor 22 and the design of the disk drive 10. The actuator motor 22 can be implemented in a number of alternate ways known by those skilled in the art. For example, the actuator motor 22 can be a rotary voice coil actuator or a linear voice coil actuator. In the embodiment shown in FIG. 3, the actuator motor 22 is a rotary voice coil actuator. In this embodiment, activation of the actuator motor 22 rotates the E-block 16 and precisely moves the transducer assemblies 20 relative to the storage disks 28.

As illustrated in FIG. 3, the actuator motor 22 includes a coil 36 that is attached to the E-block 16. The coil 36 is disposed between a pair of spaced apart permanent magnets 38 (only one (1) magnet 38 is shown) and a pair of spaced apart flux return plates 40 (only one (1) flux return plate 40 is shown) which are secured to the drive housing 12.

The magnets 38 have pole faces of opposite polarity directly facing opposite legs of the coil 36. The resultant magnetic fields are such that current passing through the coil 36 in one (1) direction causes rotation of the E-block 16 in one (1) radial direction relative to the disk assembly 14, while reverse current causes reverse direction movement. Thus, the actuator motor 22 is able to bi-directionally rotate the E-block 16 relative to the drive housing 12.

The transducer assemblies 20 transfer or transmit information between the computer (not shown) or word processor (not shown) and the storage disks 28. In the embodiment provided herein, each transducer assembly 20 includes a load beam 42, a baseplate (not shown) securing the load beam 42 to the actuator arm 18, a flexure 44, and a data transducer 46. The load beam 42 attaches the flexure 44 and the data transducer 46 to the E-block 16. Typically, each load beam 42 is flexible in a direction perpendicular to the storage disk 28 and acts as a spring for supporting the data transducer 46.

Each flexure 44 is used to attach one (1) of the data transducers 46 to one (1) of the load beams 42. Typically, each flexure 44 includes a plurality of conductive flexure traces 47 which are electrically connected to the data transducer 46. Each flexure 44 is subsequently attached to a flex circuit 48 which electrically connects the flexures 44 to the disk drive 10.

Each data transducer 46 interacts with one (1) of the storage disks 28 to access or transfer information to the storage disk 28. For a magnetic storage disk 28, the data transducer 46 is commonly referred to as a read/write head. It is anticipated that the present device can be utilized for data transducers 46 other than read/write heads for a magnetic storage disk 28.

The E-block 16 retains and positions the transducer assemblies 20 proximate the appropriate track on the storage disk 28. As can best be seen with reference to FIGS. 4–9, the E-block 16 includes an actuator hub 50 and a plurality of parallel actuator arms 18 which are attached to and cantilever from the actuator hub 50. In the embodiment illustrated in the Figures, the actuator hub 50 is substantially tubular and can be mounted to an actuator shaft 52 (illustrated in FIG. 3). The actuator hub 50 rotates on a hub axis 53 relative to the actuator shaft 52 on an actuator bearing assembly (not shown).

The actuator arms 18 move with the actuator hub 50 and position the transducer assemblies 20 between the storage disks 28, proximate the storage surfaces 30. Each actuator arm 18 includes a proximal section 54 which is secured to the actuator hub 50 and a distal section 56 which cantilevers away from the actuator hub 50. The spacing of the actuator arms 18 varies according to the spacing of the storage disks 28. The distance between consecutive actuator arms 18 is typically between about one millimeter (1 mm) to three millimeters (3 mm).

The distal section 56 of each actuator arm 18 can have a substantially rectangular cross-section and include a transducer hole 58 to facilitate attaching the transducer assemblies 20 to the actuator arms 18. As can best be seen in FIGS. 4, 6, and 8, a width of each actuator arm 18 can taper from the proximal section 54 to the distal section 56. The amount of taper can vary according to the design of actuator hub 50 and the design of the disk drive 10. Typically, the width tapers between about eight degrees to twenty degrees (8°–20°).

Additionally, each actuator arm 18 can include one (1) or more arm apertures 59 to lighten each actuator arm 18. The size, shape, and number of the arm apertures 59 must be consistent with the need for each actuator arm 18 to be sufficiently rigid and the need to minimize aerodynamic drag and turbulence.

Figure 4:
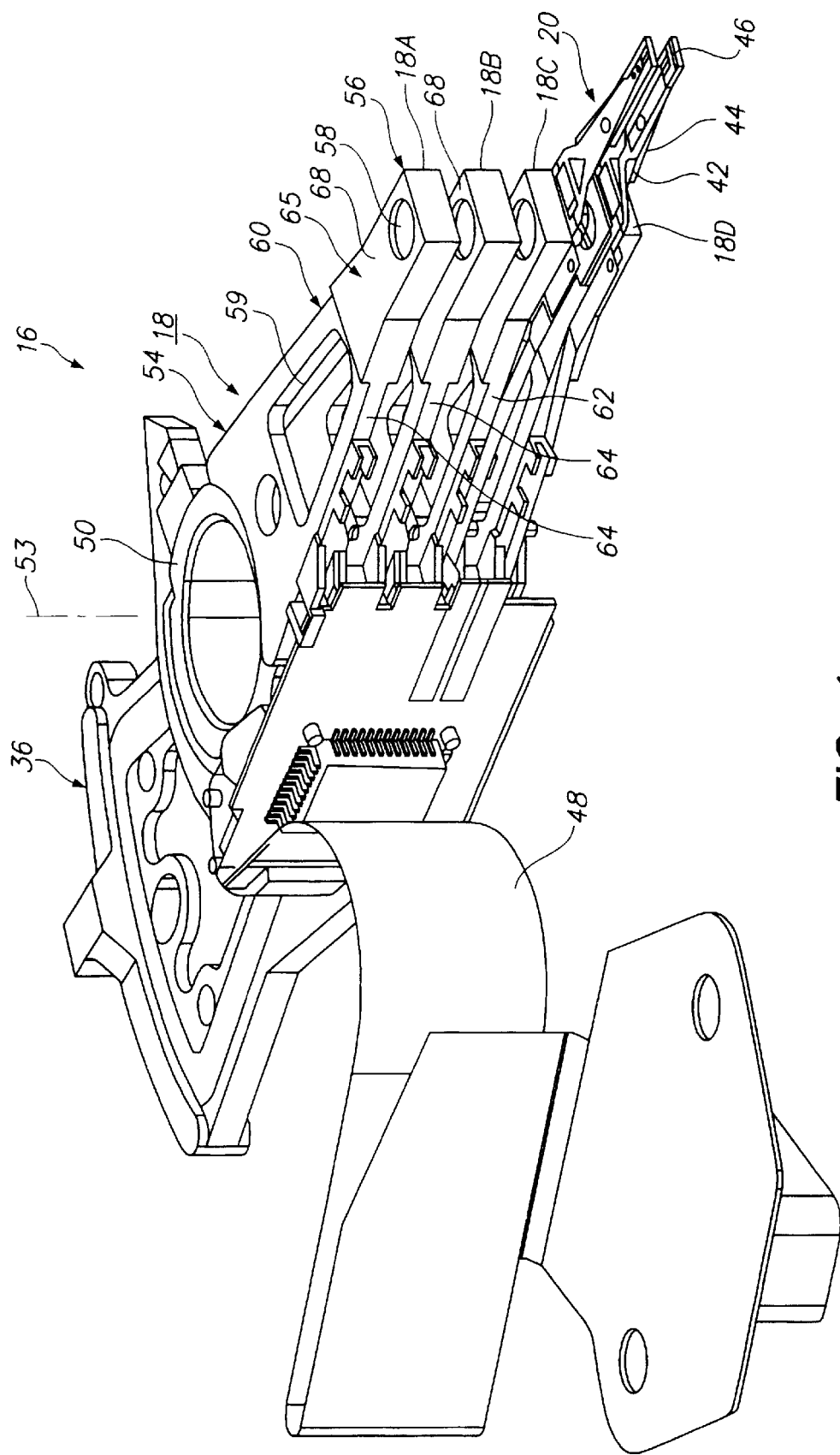
FIG. 4 is a perspective view of a first embodiment of an E-block, transducer assemblies, coil and flex circuit having features of the present invention.
Figure 5:
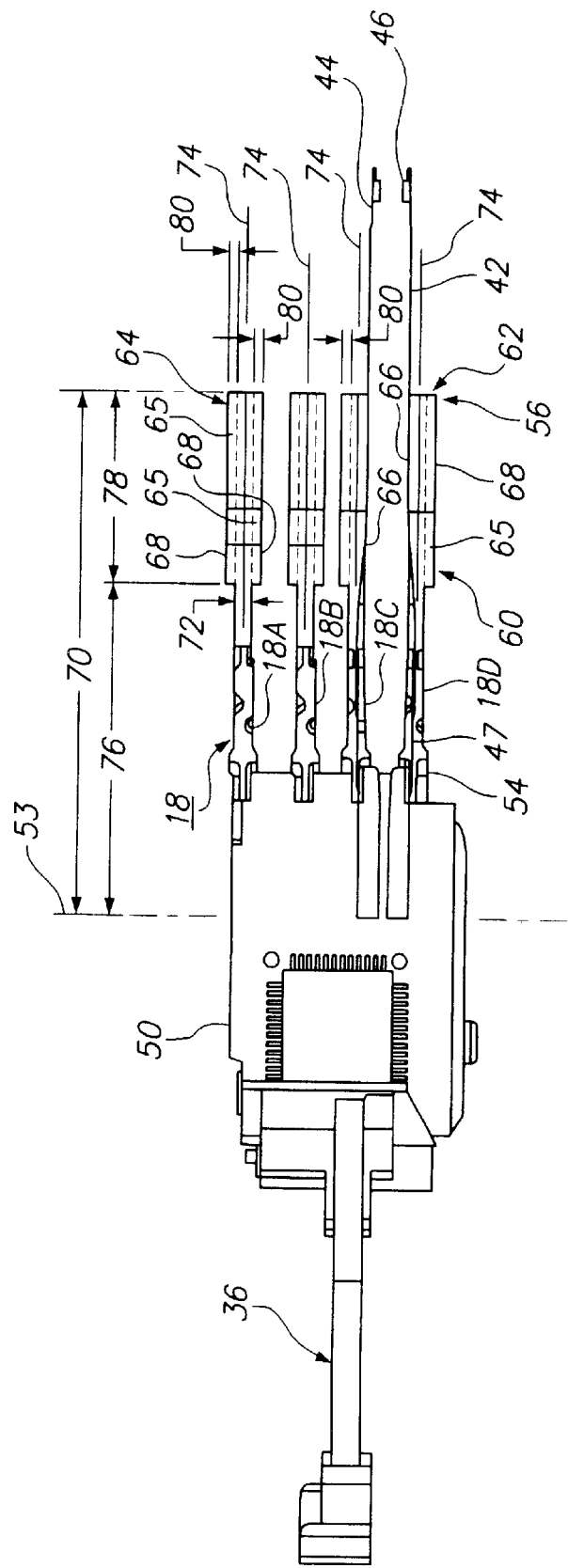
FIG. 5 is a side plan view of the E-block, transducer assemblies and coil illustrated in FIG. 4.
Figure 6:
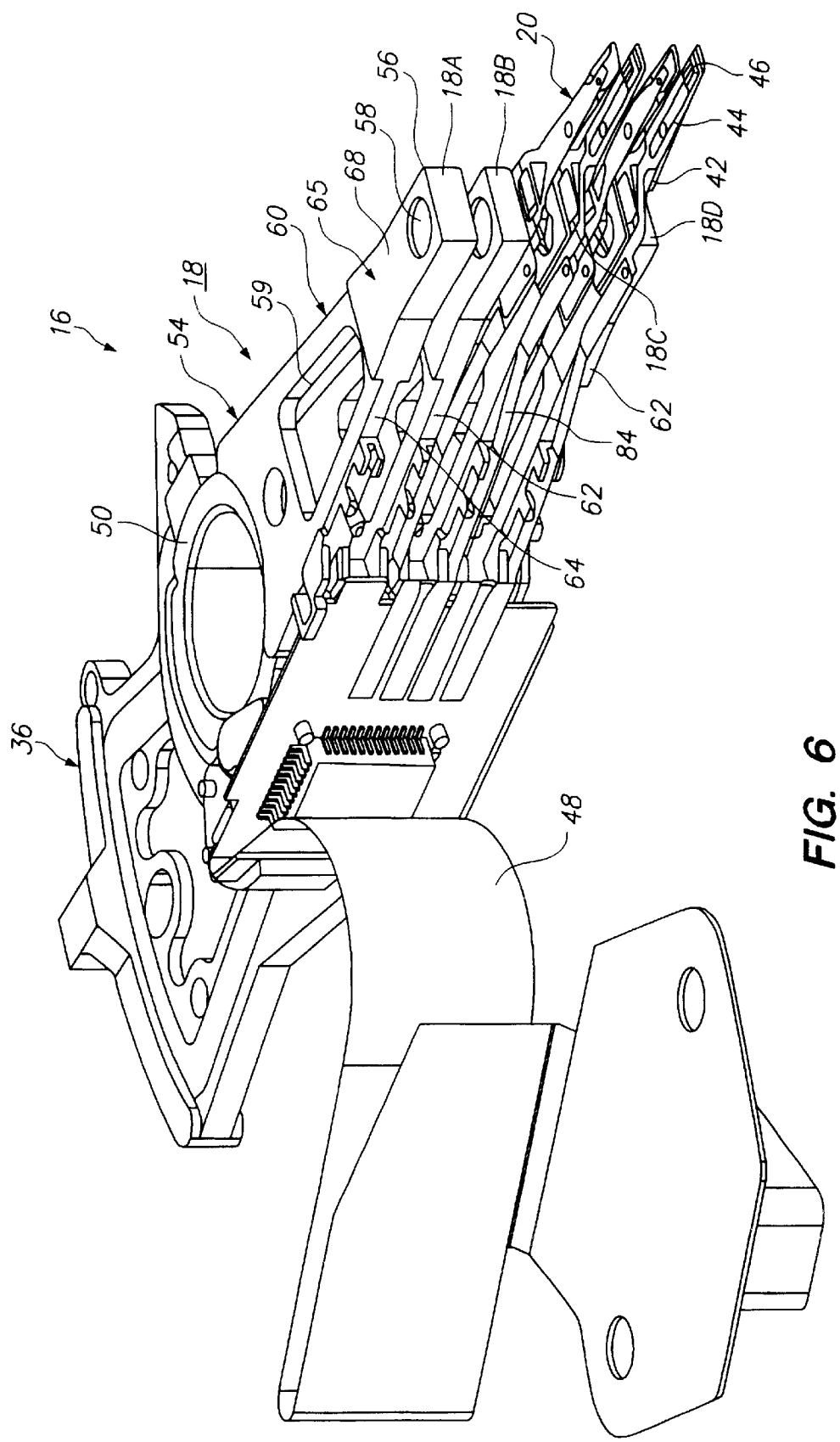
FIG. 6 is a perspective view of a second embodiment of an E-block, transducer assemblies, coil and flex circuit having features of the present invention.
Figure 8:
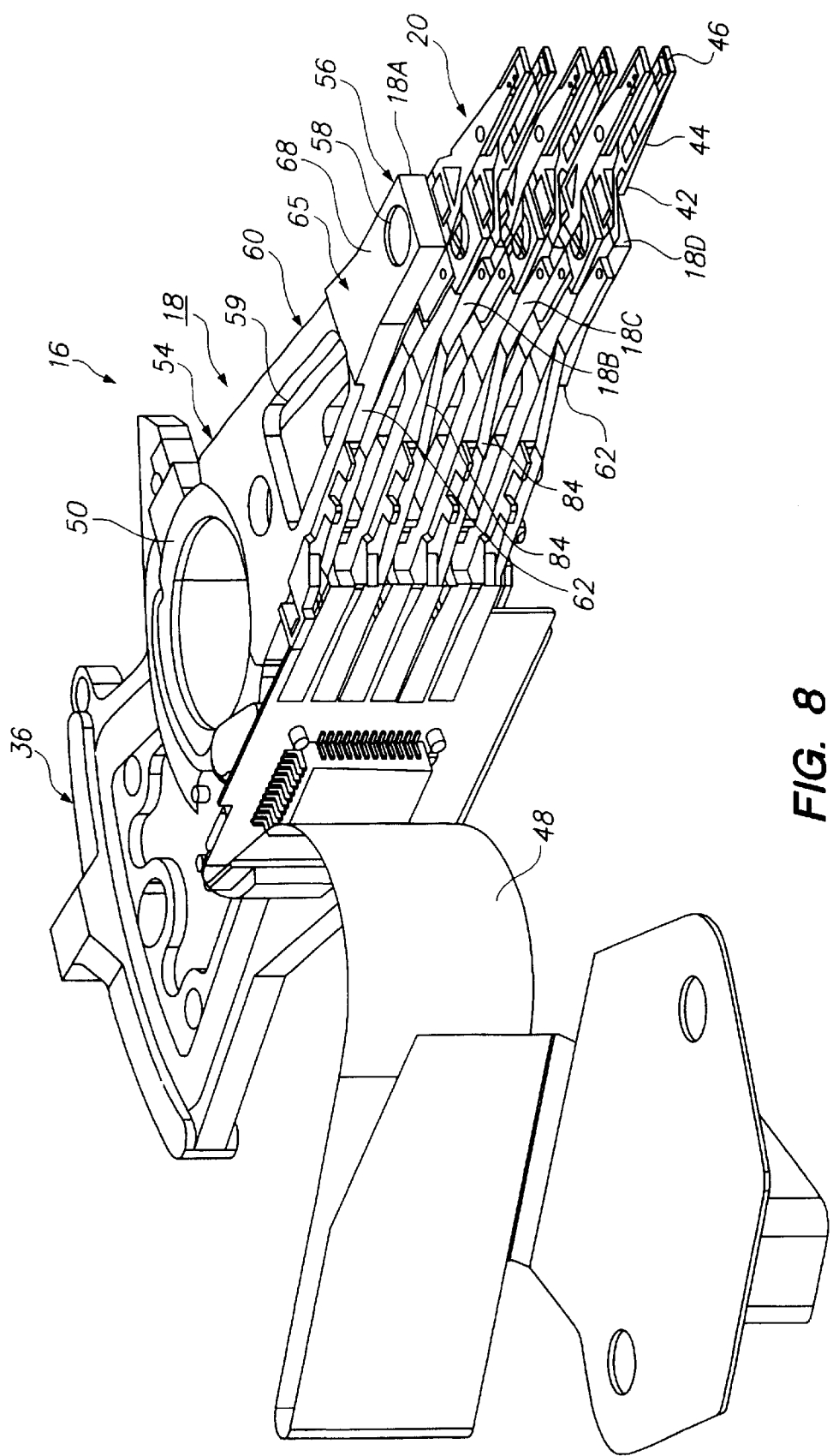
FIG. 8 is a perspective view of a third embodiment of an E-block, transducer assemblies, coil and flex circuit having features of the present invention.

FIGS. 4, 6, and 8, illustrate a perspective view of three alternate embodiments of an E-block 16. In each of these embodiments, the E-block 16 includes four spaced apart actuator arms 18. For convenience, the top actuator arm 18 shall be designated the first actuator arm 18A, the next actuator arm 18 shall be designated the second actuator arm 18B, the next actuator arm 18 shall be designated the third actuator arm 18C, while the lowest actuator arm 18 shall be designated the fourth actuator arm 18D.

In each embodiment illustrated in FIGS. 4, 6, and 8, the E-block 16 includes one or more depopulated actuator arms 60. Each depopulated actuator arm 60 is designed to retain less than two transducer assemblies 20. Two types of depopulated actuator arms 60 are illustrated, namely a single head actuator arm 62 and a no head actuator arm 64. Importantly, each depopulated actuator arm 60 includes one or more weighted segments 65 integrally formed into the depopulated actuator arm 60 to improve the resonance characteristics of the E-block 16. Because each weighted segment 65 is integrally formed into the E-block, the imaginary boundary of each weighted segment 65 is represented by dashed lines in FIGS. 5, 7, and 9.

The single head actuator arm 62 is designed to retain only one transducer assembly 18 and includes a coupled side 66 and an uncoupled side 68. The transducer assembly 20 is attached to the coupled side 66 while the uncoupled side 68 is barren and designed to not retain a transducer assembly. For each single head actuator arm 62 illustrated, the weighted segment 65 is integrally formed into the single head actuator arm 62 near the uncoupled side 68 and the distal section 56.

The weighted segment 65 of each single head actuator arm 62 is sized, shaped and located to improve the resonance characteristics of the single head actuator arm 62. For example, the weighted segment 65 of the single head actuator arm 62 can be designed to simulate a second transducer assembly (not shown) secured to the uncoupled side 68 of the single head actuator arm 62. Stated another way, the weighted segment 65 is sized, shaped and located to counterbalance the one transducer assembly 20 secured to the coupled side 66 of the single head actuator arm 62. Accordingly, the size, shape and location of the weighted segment 65 is varied according to the design of the transducer assembly 20.

The no head actuator arm 64 is designed to retain no transducer assemblies 18. Each no head actuator arm 64 includes a pair of opposed uncoupled sides 68 which are barren and a pair of spaced apart weighted segments 65. Each weighted segment 65 is integrally formed into the no head actuator arm 64 near one of the uncoupled sides 68 and the distal section 56. Each weighted segment 65 is sized, shaped and positioned to improve the resonance characteristics of the E-block 16. For example, the weighted segments 65 of the no head actuator arm 64 can be sized, shaped and located to simulate a pair of transducer assemblies (not shown) secured to the no head actuator arm 64. Accordingly, the size, shape and location of each weighted segment 52 is varied according to the design of the transducer assemblies 20 used for the disk drive 10.

Importantly, the weighted segment 65 of the single head actuator arm 62 compensates for the asymmetry caused by having only one transducer assembly 20 secured to the single head actuator arm 62. Somewhat similarly, the weighted segments 65 of the no head actuator arm 64 compensate for the asymmetry, relative to the other actuator arms 18 on the E-block 16, caused by having no transducer assemblies secured to the no head actuator arm 64. Thus, with the integrally formed weighted segment(s) 65, the present invention compensates for the asymmetry without adding a separate component (not shown) which cantilevers away from the actuator arm 18.

Preferably, the weighted segment 65 of the single head actuator arm 62 is sized, shaped and positioned substantially similar to each weighted segment 65 of the no head actuator arm 64. This allows the single head actuator arm 62 to have similar resonance characteristics as the no head actuator arm 64.

The specific design of each weight segment 65 is varied according to the design of the disk drive 10 and the transducer assemblies 20. The specific details of one embodiment of the weighted segment 65 can probably best be understood with reference to FIGS. 4 and 5. Each actuator arm 18 has an arm length 70 from the hub axis 53, a proximal section thickness 72 proximal to the weighted segment 65 and an arm longitudinal axis 74. As illustrated in the FIG. 5, each weighted segment 65 is positioned a segment distance 76 from the hub axis 53 of the actuator hub 50 and extends a segment length 78. Further, each weighted segment 65 has a segment thickness 80. In the embodiment illustrated in FIG. 5, for each weighted segment 65, the segment distance 76 is approximately 25 mm from the hub axis 53 and the segment length 78 is approximately 2 mm, and the segment thickness 80 is approximately 0.6 mm. Further, each weighted segment 65 weighs approximately 0.07 grams. The specific size, shape and location of the weighted segments 65 can be precisely adjusted and optimized using finite element analysis.

Additionally, as illustrated in FIGS. 6–9, the E-block 16 can also include one or more double head actuator arms 84. Each double head actuator arm 84 includes a pair of coupled sides 66 and secures two transducer assemblies 20. Because each double head actuator arm 84 secures two transducer assemblies 20, each double head actuator arm 84 is symmetrical and does not include a weighted segment 65. The double head actuator arms 84 are also referred to as being "populated".

In addition to one or more weighted segments 65, each depopulated actuator arm 60 has a lower lateral stiffness and lower resonance frequency than each double head actuator arm 84. Further, each no head actuator arm 64 has a lower lateral stiffness and lower resonance frequency than each single head actuator arm 62. Similarly, each single head actuator arm 62 has a lower lateral stiffness and lower resonance frequency than each double head actuator arm 84. The lower lateral stiffness is believed to compensate for the fact that each weighted segment(s) 65 does not cantilever like the transducer assembly 20.

The amount of reduced stiffness for each depopulated actuator arm 60 varies according to the design of the disk drive 10, the transducer assembly 20 and the weighted segment(s) 65. The desired amount of difference in lateral stiffness can be precisely optimized using finite element analysis.

The lower lateral stiffness in the depopulated actuator arms 60 can be accomplished in a number of ways. For example, the arm apertures 59 in the depopulated actuator arms 60 can be larger than the arm apertures 59 in the double head actuator arms 84. Alternately, the arm thickness 72 for the depopulated actuator arms 60 could be less than the arm thickness 72 for the double head actuator arms 84. In particular, in the embodiments provided herein, the arm thickness 72 for the no head actuator arm 64 is between approximately 0.1 to 0.2 millimeters less than the arm thickness 72 for the single head actuator arm 62. Similarly, the arm thickness 72 for the single head actuator arm 62 is between approximately 0.1 to 0.2 millimeters less than the arm thickness 72 for the double head actuator arm 84.

Importantly, the present invention utilizes integrally formed weighted segment(s) 65 and reduced lateral stiffness to modify the resonance characteristics of the no head actuator arms 64 and single head actuator arms 62. Preferably, the resonance characteristics of each no head actuator arm 64 and single head actuator arm 62 are modified to simulate and have similar vibration characteristics as the double head actuator arms 84. This allows the manufacturer of the disk drive 10 to better tune all of the actuator arms 18 of the disk drive 10 to minimize data transducer 46 slap and off-track motion. This decreases drive fragility during shipping, handling, installation and usage of the disk drive 10.

In summary, the lateral stiffness and the mass of the weighted segment(s) 65 are increased until the natural resonance frequency of the arm modes on each depopulated actuator arm 60 align with the resonance frequency of each populated arm 84.

Figure 10:
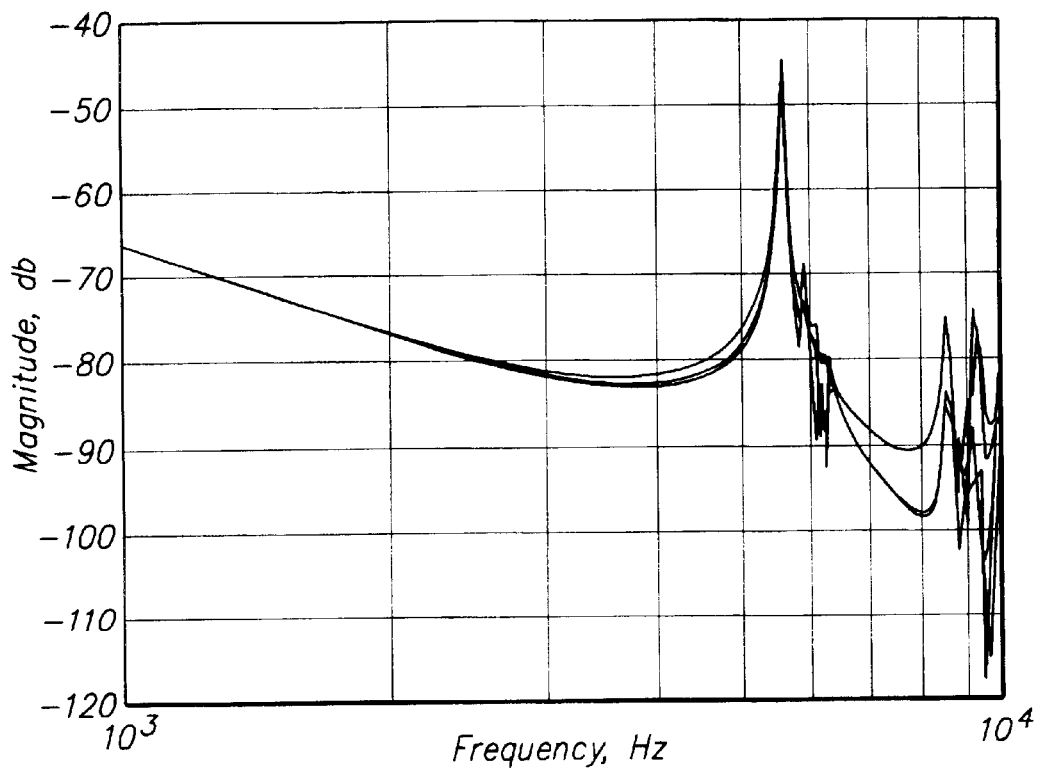
FIG. 10 illustrates a computer simulation of the resonance curves for the data transducers illustrated in FIGS. 8 and 9 after movement.

FIG. 10 illustrates a computer simulation of the resonance curves for each of the six data transducers 46 illustrated in FIGS. 8 and 9 after movement by the actuator motor 22. From FIG. 10, it is important to recognize that the resonance curves for each of the data transducers 46 are substantially the same as a result of the unique design of the E-block 16.

Figure 11:
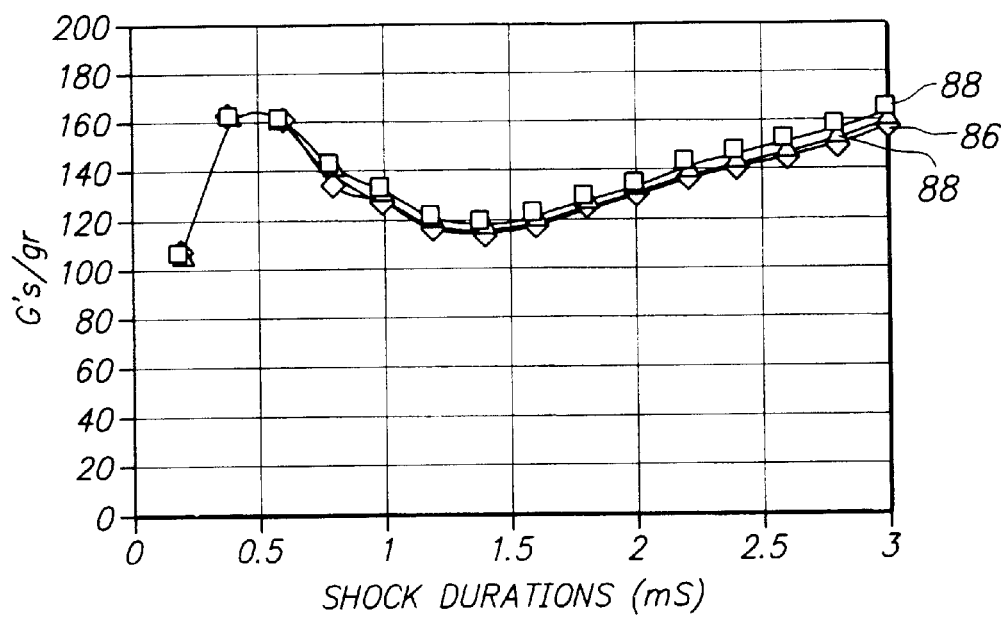
FIG. 11 illustrates a computer simulation of the G's to unload the transducers from the storage disk as a function of shock duration for the embodiment illustrated in FIGS. 8 and 9.

FIG. 11 illustrates a computer simulation of G's to unload as a function of shock duration for the embodiment illustrated in FIGS. 8 and 9. More specifically, FIG. 11 illustrates the G's required to lift the transducer assembly 20 from the storage disk 28. In particular, the curve designated 86 illustrates the movement of the transducer assembly 20 for a single head actuator arm 62. Somewhat similarly, curves designated 88 each illustrate the movement of one of the transducer assemblies 20 for the double head actuator arm 84. From FIG. 11, it is clear that as a result of the unique invention, the movement of the transducer assemblies 20 is very similar when subjected to a shock. Thus, the manufacturer can better tune the disk drive 10 to minimize the effects of a shock.

Figure 12:
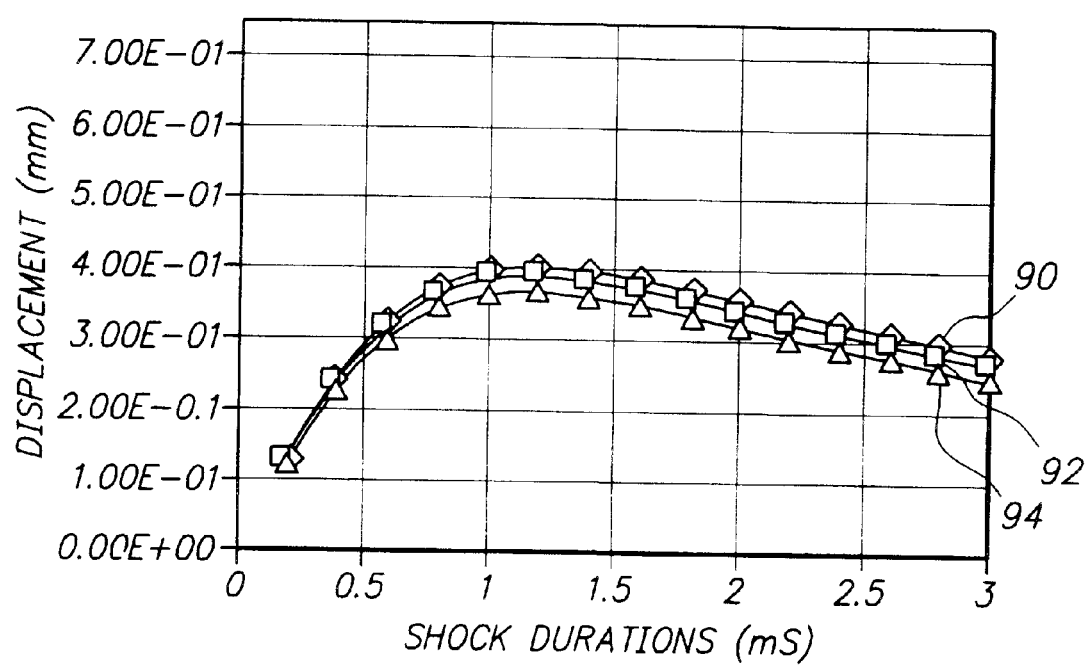
FIG. 12 illustrates a computer simulation of the arm deflection of the actuator arms as a function of shock duration for the E-block illustrated in FIGS. 8 and 9.

FIG. 12 illustrates a computer simulation of the deflection of the actuator arms 18 of the E-block 16 illustrated in FIG. 8 and 9 as a function of shock duration. In particular, curve designated 90 illustrates the movement of the no head actuator arm 64, curve designated 92 illustrates the deflection of the single head actuator arm 62, and curve designated 94 illustrates the movement of the double head actuator arm 84 for a given shock. As a result of the present invention, the actuator arms 18 react somewhat similarly when subjected to a given shock. This allows a manufacturer to better tune the disk drive 10 to compensate for such shocks.

Referring back to FIGS. 4 and 5, the E-block 16 illustrated therein is designed for use with a disk drive 10 having a single storage disk 28 (not shown in FIGS. 4 and 5). The E-block 16 includes a pair of no head actuator arms 64 and a pair of single head actuator arms 62. In this embodiment, the first and second actuator arms 18A, 18B, are no head actuator arms 64 while the third and fourth actuator arms 18C, 18D, are single head actuator arms 62. The one storage disk is positioned between the two single head actuator arms 62.

In the embodiment illustrated in FIGS. 6 and 7, the E-block 16 is designed for use with a disk drive 10 having two storage disks 28 (not shown in FIGS. 6 and 7). In this embodiment, the first actuator arm 18A is no head actuator arm 64, the second and fourth actuator arms 18B and 18D, are single head actuator arms 62 and the third actuator arm 18C is a double head actuator arm 84.

In the embodiment illustrated in FIGS. 8 and 9, the E-block 16 is designed for use with a disk drive 10 having three storage disks 28 (not shown in FIGS. 8 and 9). In this embodiment, the first and fourth actuator arms 18A, 18D, are single head actuator arms 62 while the second and third actuator arms 18B, 18C, are double head actuator arms.

Many processes can be used to make the E-block 16. For example, the E-block 16 could be extruded and machined to the proper dimensions. Alternately, the E-block 16 could be injection molded or cast. Suitable materials for the E-block 16 are an aluminum alloy, a magnesium alloy, reinforced plastic, or a ceramic material. Alternately, the actuator arms 18 may be formed as separate pieces which are attached together by suitable joining techniques known by those skilled in the art.

Uniquely, the present invention allows the E-block 16 for the alternate embodiments illustrated in FIGS. 4, 6, and 8, to each be machined from the same style of casting. Stated another way, the same mold (not shown) can be used for the alternate embodiments illustrated in FIGS. 4, 6, and 8. After the rough E-block (not shown) is removed from the mold, the actuator arms 18 are machined to the desired configurations. Thus, a single mold can be used to make balanced E-blocks for alternate drive configurations. Further, because each weighted segment 65 is integrally formed as part of the actuator arm 18, there are no additional components necessary.

Moreover, the weighted segment(s) 65 and the reduced lateral stiffness allow the no head actuator arm 64 and the single head actuator arm 62 to have similar vibration characteristics as the double head actuator arm 84. Thus, the three embodiments of the E-block 16 illustrated in FIGS. 4, 6, and 8, have somewhat similar vibration characteristics even though each is designed for an alternate drive configuration.

In summary, because of the unique process provided herein, the E-block 16 for a number of alternate disk drives 10 can be made from the same mold. Further, the E-block 16 improves the resonance characteristics of the disk drive 10 without adding additional counterbalance parts and/or components. Moreover, because each weighted segment 65 does not cantilever away from the actuator arm 18, the inertia of the E-block is not significantly increased.

While the particular E-block 16 and disk drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
    a drive housing;
    an actuator hub that is movably coupled to the drive housing;
    one or more transducer assemblies coupled to the actuator hub;
    a first actuator arm that extends away from the actuator hub, the first actuator arm supporting less than two transducer assemblies, the first actuator arm including a first uncoupled side, the first actuator arm having a weighted segment that is homogeneously formed into the first uncoupled side, the weighted segment of the first actuator arm being formed by a material removal operation; and
    a spaced apart second actuator arm that extends away from the actuator hub, the second actuator arm supporting at least one transducer assembly;
    wherein the first actuator arm has a weight that is greater than the weight of the second actuator arm, and wherein the first actuator arm and the second actuator arm have different resonance characteristics.

2. The disk drive of claim 1 further comprising a third actuator arm that supports no transducer assemblies, and wherein the third actuator arm includes two weighted segments that are homogeneously formed into the third actuator arm, the third actuator arm being formed by a material removal operation.

3. The disk drive of claim 1 wherein the first actuator arm has a distal section with a distal section thickness, and the second actuator arm has a distal section with a distal section thickness, the actuator arms being formed by removing more mass from the distal section of the second actuator arm than from the distal section of the first actuator arm.

4. An E-block for a disk drive, the disk drive including one or more transducer assemblies and one or more storage disks, the E-block comprising:
    an actuator hub; and
    a no head actuator arm secured to the actuator hub, the no head actuator arm supporting no transducer assemblies, the no head actuator arm including a first uncoupled side, a second uncoupled side, a first weighted segment positioned near the first uncoupled side, a second weighted segment positioned near the second uncoupled side, the weighted segments influencing the resonance characteristics of the no head actuator arm.

5. The E-block of claim 4 further comprising a single head actuator arm that extends away from the actuator hub, the single head actuator arm supporting a single transducer assembly, wherein the no head actuator arm and the single head actuator arm have different resonance characteristics.

6. The E-block of claim 5 further comprising a double head actuator arm secured to the actuator hub, the double head actuator arm supporting two transducer assemblies, wherein the no head actuator arm and the double head actuator arm have different resonance characteristics.

7. The E-block of claim 4 further comprising a double head actuator arm secured to the actuator hub, the double head actuator arm supporting two transducer assemblies, wherein the no head actuator arm and the double head actuator arm have different resonance characteristics.

8. The E-block of claim 4 including a single head actuator arm secured to the actuator hub, the single head actuator arm supporting one of the transducer assemblies, the single head actuator arm having a higher lateral stiffness than the no head actuator arm.

9. The E-block of claim 8 including a double head actuator arm secured to the actuator hub, the double head actuator arm supporting two of the transducer assemblies, the double head actuator arm having a higher lateral stiffness than the no head actuator arm.

10. The E-block of claim 4 including a double head actuator arm secured to the actuator hub, the double head actuator arm supporting two of the transducer assemblies, the double head actuator arm having a higher lateral stiffness than the no head actuator arm.

11. A method for manufacturing an E-block for a disk drive, the disk drive including one or more transducer assemblies, the method comprising the steps of:
    providing a first actuator arm and a second actuator arm, the first actuator arm being adapted to support less than two transducer assemblies, the second actuator arm being adapted to support at least one transducer assembly more than the first actuator arm; and
    selectively removing material from the actuator arms so that the second actuator arm has a weight that is less than a weight of the first actuator arm, and the first actuator arm and the second actuator arm have different resonance characteristics.

12. The method of claim 11 wherein the step of selectively removing material includes removing material from the E-block so that the weight of the second actuator arm is approximately equal to the weight of the first actuator arm less a weight of one transducer assembly.

13. The method of claim 11 wherein the step of a selectively removing material includes removing material from the first actuator arm to form two weighted segments on the first actuator arm, and removing material from the second actuator arm to form one weighted segment on the second actuator arm.

14. The method of claim 11 further comprising the steps of providing a third actuator arm and removing material from the third actuator arm so that the weight of the third actuator arm is different from the weight of the second actuator arm and the first actuator arm.

15. The method of claim 14 including the steps of removing material from the first actuator arm to form two weighted segments on the first actuator arm, removing material from the second actuator arm to form one weighted segment on the second actuator arm, and removing material from the third actuator arm so that the third actuator arm is devoid of any weighted segments.

16. The method of claim 14 wherein the step of removing material includes removing material so that the first actuator arm, the second actuator arm and the third actuator arm have dissimilar resonance characteristics.

17. The method of claim 11 wherein the step of removing material includes removing material from the first actuator arm to form one weighted segment on the first actuator arm, and removing material from the second actuator arm so that the second actuator arm is devoid of any weighted segments.

18. A method for tuning the resonance characteristics of an E-block of a disk drive, the method comprising the steps of:

providing an E-block having a first actuator arm and a second actuator arm, the first actuator arm supporting n transducer assemblies, and the second actuator arm supporting n+1 transducer assemblies; and selectively removing a greater amount of material from the second actuator arm than the first actuator arm so that the first actuator arm and the second actuator arm have different resonance characteristics.

19. The method of claim 18 wherein the step of selectively removing material includes removing material from the first actuator arm so that the first actuator arm includes m weighted segments, and removing material from the second actuator arm so that the second actuator arm includes m−1 weighted segments.

20. The method of claim 19 wherein each weighted segment has a weight that is approximately equal to a weight of one transducer assembly.

21. The method of claim 18 wherein the step of providing an E-block includes providing a third actuator arm that supports n+2 transducer assemblies.

22. The method of claim 21 wherein the step of selectively removing includes removing a greater amount of material from the third actuator arm than the first actuator arm and the second actuator arm so that the third actuator arm has different resonance characteristics than the first actuator arm and the second actuator arm.

23. An E-block for a disk drive, the disk drive including one or more transducer assemblies and one or more storage disks, the E-block comprising:

an actuator hub;

a no head actuator arm that extends away from the actuator hub, the no head actuator arm being adapted to retain no transducer assemblies, the no head actuator arm including a first uncoupled side and a first weighted segment integrally formed into the no head actuator arm near the first uncoupled side, and a second uncoupled side and a second weighted segment integrally formed into the no head actuator arm near the second uncoupled side, the second weighted segment being sized, shaped and positioned to influence the resonance characteristics of the no head actuator arm; and a double head actuator arm that extends away from the actuator hub, the double head actuator arm being adapted to secure two transducer assemblies, the double head actuator arm having a higher lateral stiffness than the no head actuator arm.

24. The E-block of claim 23 wherein the double head actuator arm has an arm thickness which is greater than an arm thickness of the no head actuator arm.

25. A disk drive comprising:

a drive housing;

an actuator hub that is movably coupled to the drive housing;

one or more transducer assemblies coupled to the actuator hub; and a no head depopulated actuator arm that cantilevers from the actuator hub, the depopulated actuator arm supporting no transducer assemblies, the depopulated actuator arm including a first uncoupled side and a first weighted segment homogeneously formed into the depopulated actuator arm near the first uncoupled side, and a second uncoupled side and a second weighted segment that is homogeneously formed into the no head actuator arm near the second uncoupled side, the weighted segments influencing the resonance characteristics of the no head actuator arm.

26. The disk drive of claim 25 including a double head actuator arm secured to the actuator hub, the double head actuator arm supporting two of the transducer assemblies, the double head actuator arm having a higher lateral stiffness than the no head actuator arm.

27. A disk drive comprising:

a drive housing;

an actuator hub movably coupled to the drive housing;

a plurality of transducer assemblies coupled to the actuator hub;

a depopulated actuator arm that cantilevers from the actuator hub, the depopulated actuator arm supporting no transducer assemblies, the depopulated actuator arm including a first uncoupled side and a first weighted segment homogeneously formed into the depopulated actuator arm near the first uncoupled side, and a second uncoupled side and a second weighted segment that is homogeneously formed into the depopulated actuator arm near the second uncoupled side, the weighted segments influencing the resonance characteristics of the depopulated actuator arm; and a double head actuator arm that cantilevers from the actuator hub, the double head actuator arm supporting two of the transducer assemblies, the double head actuator arm having a higher lateral stiffness than the depopulated actuator arm.

28. The disk drive of claim 27 wherein the double head actuator arm has an arm thickness which is greater than an arm thickness of the depopulated actuator arm.

* * * * *

UNITED STATES PATENT AND TRADEMARK OFFICE
CERTIFICATE OF CORRECTION

PATENT NO. : 6,775,106 B1
DATED : August 10, 2004
INVENTOR(S) : Williams et al.

It is certified that error appears in the above-identified patent and that said Letters Patent is hereby corrected as shown below:

Column 12,
Line 44, please delete the word "a".

Signed and Sealed this

Twenty-third Day of November, 2004

JON W. DUDAS
*Director of the United States Patent and Trademark Office*